Feb. 3, 1970    E. J. STRANG ET AL    3,493,030
TIRE CHANGING STAND WITH ROTATABLE RIM GRIPPING TABLE
Filed Aug. 18, 1967    5 Sheets-Sheet 1
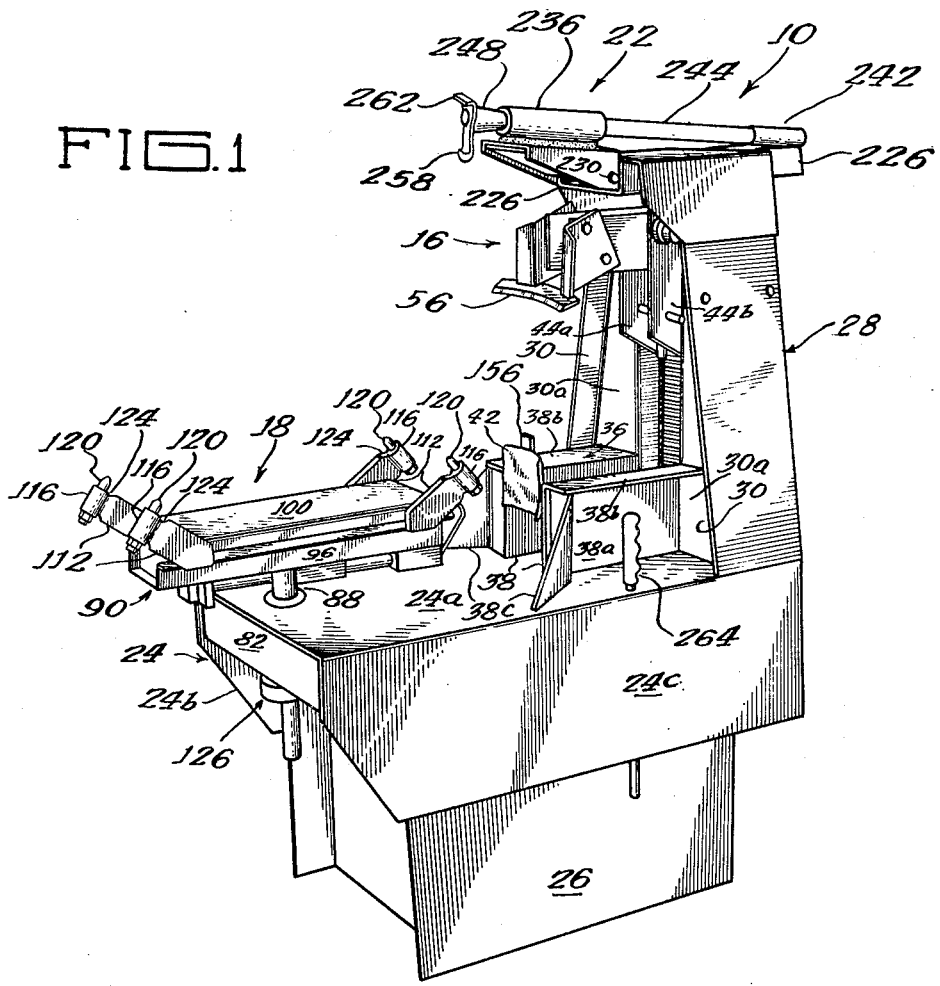
Inventors
Elmer J. Strang
Billy L. Sorenson
David V. White
By: Hofgren, Wegner, Allen,
Stellman & McCord
Attorneys

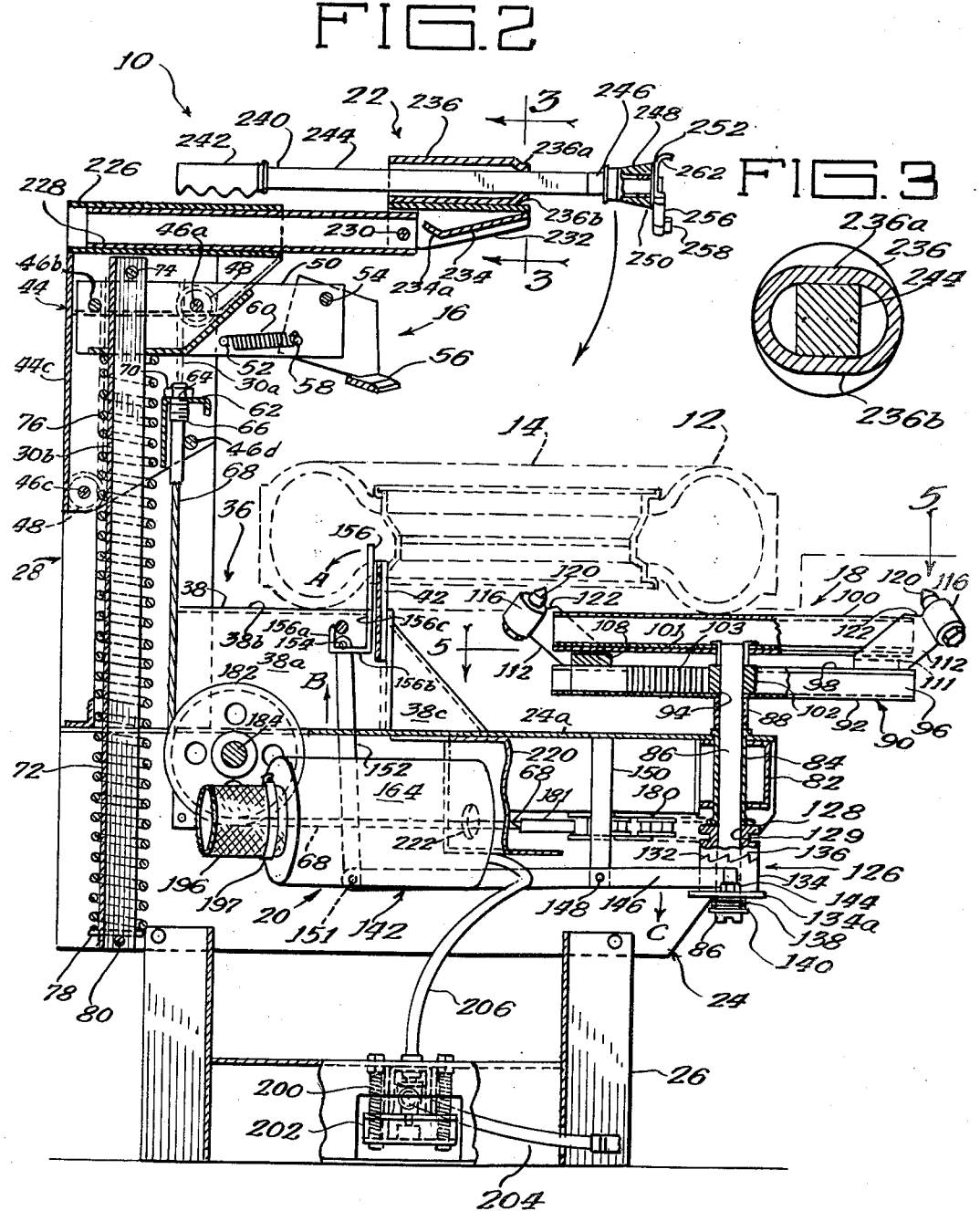

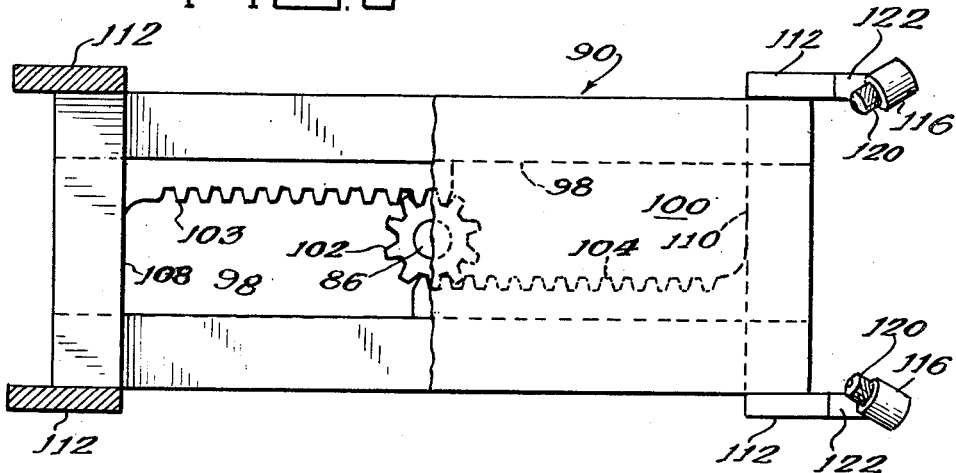
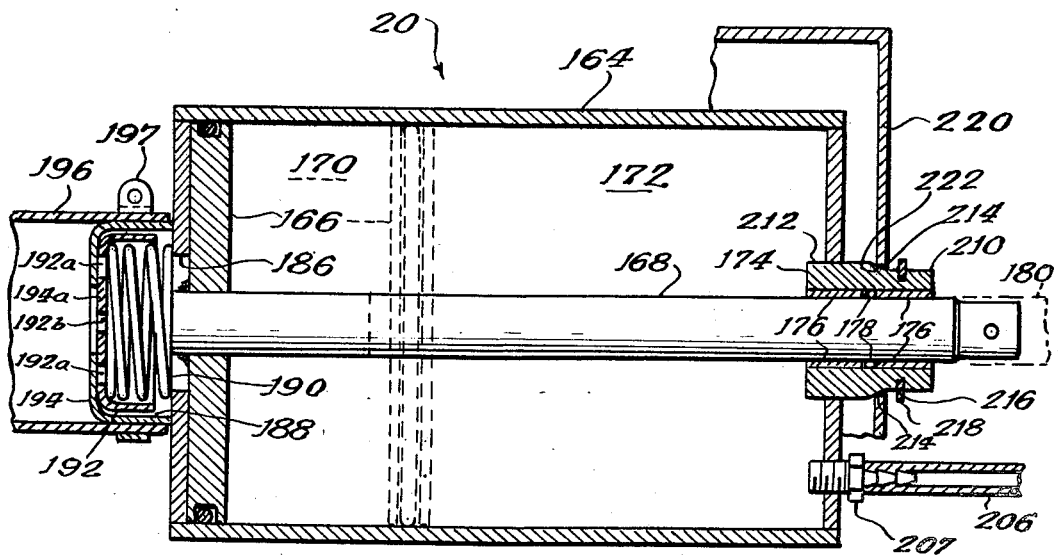
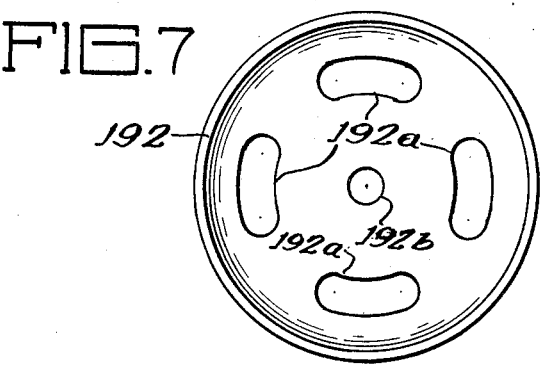
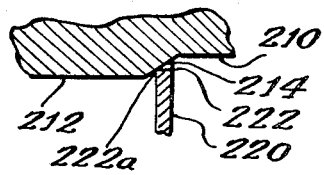

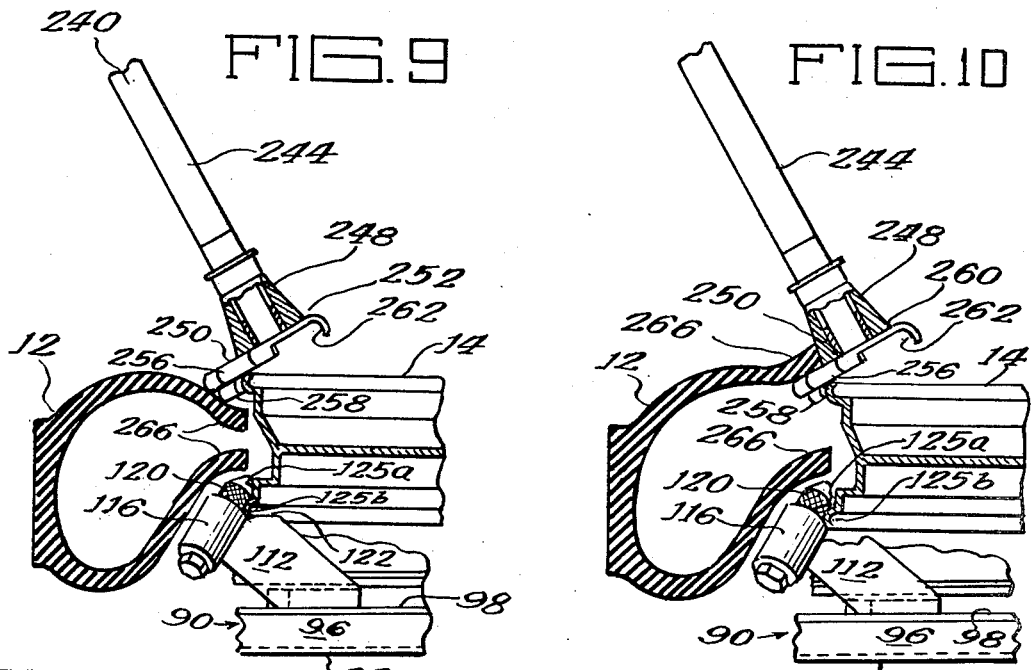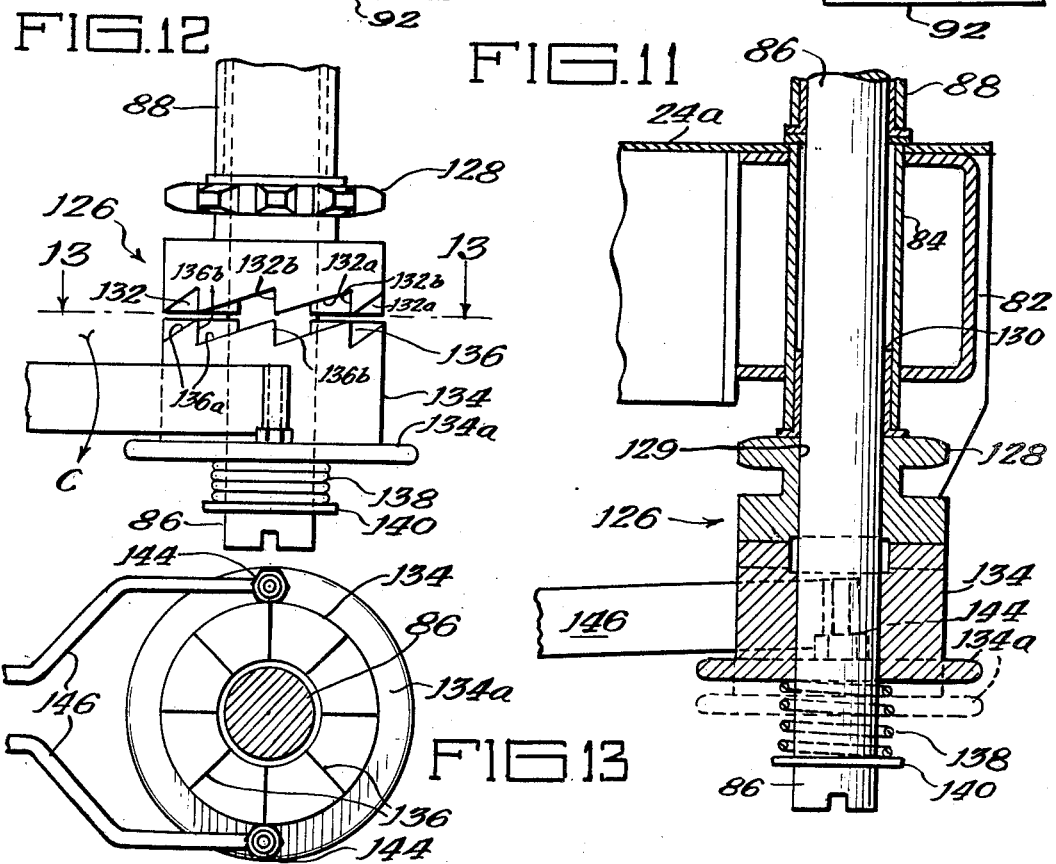

United States Patent Office 3,493,030
Patented Feb. 3, 1970

3,493,030
TIRE CHANGING STAND WITH ROTATABLE RIM GRIPPING TABLE
Elmer J. Strang, David V. White, and Billy L. Sorenson, Fort Dodge, Iowa, assignors to The Coats Company, Inc., a corporation of Iowa
Filed Aug. 18, 1967, Ser. No. 661,686
Int. Cl. B60c 25/10, 25/06
U.S. Cl. 157—1.24                 12 Claims

ABSTRACT OF THE DISCLOSURE

A tire changing stand having a base with a rotatable rim holding table on one end of the base and an upright column at the other end of the base having a movable bead breaker shoe for loosening beads from a wheel rim resting partially on the table with a single motor means for driving both the bead breaker shoe and the rim holding table. The motor drives a flexible tensioned drive member and the connection between the drive member and the rim holding table is selectively connectable and disconnectable so that the bead breaker shoe may be actuated without actuating the rim holding table. In addition, the tire mounting and demounting tool is mounted above the rim holding table by an arrangement which affords positive optimum location of the tire holding tool relative to the rim for any size or type vehicle rim which may be accommodated within the limits of the stand.

BACKGROUND OF THE INVENTION

Field of the invention

This invention relates to tire changing stands and more particularly to an improved tire changing stand of the type having a rotatable rim holding table.

Description of the prior art

A major development in the art of tire changing stands is that shown and claimed in Tabordon Patent No. 3,255,801 issued June 14, 1966 and assigned to the assignee of this invention. In the structure shown in the aforesaid Tabordon patent, a single power source drives the bead breaker shoes and rotates a tire tool driving shaft. Improved versions of this basic system are shown in Foster Patent No. 3,212,552 issued Oct. 19, 1965 and Strang Patent No. 3,355,800 issued June 14, 1966, both of these patents also assigned to the assignee of this invention. In these structures, a vehicle rim is mounted on the stand by means of a clamp which is secured on an upstanding center post that impales the wheel rim. A tire tool drive shaft is rotatable within the center post and, as the shaft is driven, a tire tool may traverse the periphery of a wheel rim to mount or demount a tire relative to the rim.

With the recent proliferation of different rim styles, sizes and shapes, it has become necessary to provide accessory equipment for tire changing stands of the type which utilize a center mounting post. Some developments have been made along the lines of a tire changing stand utilizing structure which holds a vehicle rim by means which grip the edges of the rim, either from the interior or exterior of the rim. Examples of such structures are shown in the Belgium Duquesne Patent No. 689,769 and the U.S. patent to Ray A. Scott No. 3,339,611 issued Sept. 5, 1967, entitled "Tool Holder for Tire Changing Stand," assigned to the assignee of this invention.

In the aforementioned Belgium Duquesne Patent No. 689,769, the tire changing stand includes a rotatable wheel holding table wherein the wheel rim is peripherally clamped. A tire mounting and demounting tool is held above the table on an arm and utilized to mount and demount tires from rims as the table is rotated. A commercial structure manufactured by the owner of Belgium Patent No. 689,769 also includes a piston and cylinder device mounted on the tool supporting arm with a bead breaker shoe connected to the piston rod. Actuation of the piston rod causes movement of the bead breaking shoe for breaking beads of tires away from the rims when the tire is appropriately located relative to the piston and cylinder device. However, the bead breaker means is actuated by a different power source than is utilized to rotate the tire holding table, so that two motor means are provided for accomplishing the bead breaking and tire removal functions.

Thus it has become desirable to provide a tire changing stand of the type having a rotatable rim gripping table and bead breaking means, wherein the rim gripping table and the bead breaking means are driven by a single power source.

SUMMARY OF THE INVENTION

This invention is directed, in brief, to the provision of a tire changing stand of the type having a rotatable wheel gripping table and a bead breaker shoe above the table, with a single power source utilized to drive the bead breaker shoe and to rotate the wheel gripping table, with the driving connection to the wheel gripping table being selectively connectable and disconnectable. A tire tool assembly is mounted by means insuring positive location of the tool in an optimum position for demounting or mounting tires on the rims of different sizes and shapes.

In the illustrated embodiment, which is the best mode presently contemplated by us for carrying out our invention, the tire holding table is rotatably mounted on a shaft, and the bead breaker means is trackably positioned in a column spaced from the table. A piston and cylinder device is mounted interiorly of the frame and drives a flexible tensioned drive member in the form of a cable and chain. The drive member is horizontally wound about the drive shaft for the tire holding table and vertically wound about a pulley for connection to the bead breaker shoe. The table drive shaft is provided with a clutch. A lever means connected to the tire table clutch is positioned in the area of placement of the tire for the bead breaking operation so that the presence of the tire in this area automatically disengages the clutch so as to prevent rotation of the tire holding table during the bead breaking operation.

Actuation of the piston and the cylinder device causes movement of the bead breaker shoe and also causes movement of the tire holding table when the table drive shaft clutch is engaged. The table has rim gripping jaws which move into gripping engagement with a rim upon initial rotation of the drive shaft. After the jaws lock on a rim, further rotation of the shaft drives the table. The tire holding tool is mounted in an arm which is positioned above the table, the arm being laterally slidable toward and away from the center of the table, and the tool being slidably movable in the arm upwardly way and downwardly toward the table at an angular orientation with respect to the table. The working end of the tool includes opposed put-on and take-off portions, each of which has a rim flange engaging hook. Positive optimum location of the tool relative to a rim is accomplished by sliding the arm and tool until one of the hooks grasps the rim flange.

The piston and cylinder device is mounted to the stand by providing a frusto-conical surface on the hub which projects outwardly from the cylinder head and abutting this surface against a cylindrical opening in the frame. The flexible tensioned drive member continually pulls the cylinder against the edge of the opening, providing a swivel mounting thereby eliminating side loads on cylinder bearings and seals during operation.

BRIEF DESCRIPTION OF THE DRAWINGS

FIGURE 1 is a perspective view of the tire changing and of this invention;

FIGURE 2 is a side view, generally in vertical section, of the tire changing stand of FIGURE 1;

FIGURE 3 is a section view showing the relationship between the shank of the tire tool and the sleeve in which the tool is slidably mounted, the view being generally taken along the line 3—3 of FIGURE 2;

FIGURE 5 is a section view of the rim holding table taken generally along the line 5—5 of FIGURE 2;

FIGURE 6 is a section view of the piston and cylinder device utilized in the preferred embodiment as the motor or driving the functional components of the tire changing stand, the view illustrating the mounting of the cylinder in the tire changing stand;

FIGURE 7 is an elevational view of a valve component in the metering chamber shown at the left end of the cylinder device in FIGURE 6;

FIGURE 8 is an enlarged fragmentary sectional view of a portion of FIGURE 6 showing the mounting of the cylinder to the frame of the tire changing stand in greater detail;

FIGURE 9 is a fragmentary view, partially broken away in section, showing a rim being held on the rim holding table, with the tire tool positioned in operative engagement with the rim prior to performing a tire demounting function;

FIGURE 10 is a view similar to FIGURE 9 showing one of the tire beads being pulled over the rim flange as the rim holding table is rotated;

FIGURE 11 is an enlarged fragmentary sectional view of the clutch mechanism for the rim holding table shaft;

FIGURE 12 is an enlarged fragmentary view of the clutch mechanism for the rim holding table shaft, showing the clutch disengaged so that driving force imparted to the sprocket will not be transmitted to the table shaft; and FIGURE 13 is an enlarged fragmentary section view taken generally along the line 13—13 of FIGURE 12.

DESCRIPTION OF THE PREFERRED EMBODIMENTS

Figure 4:
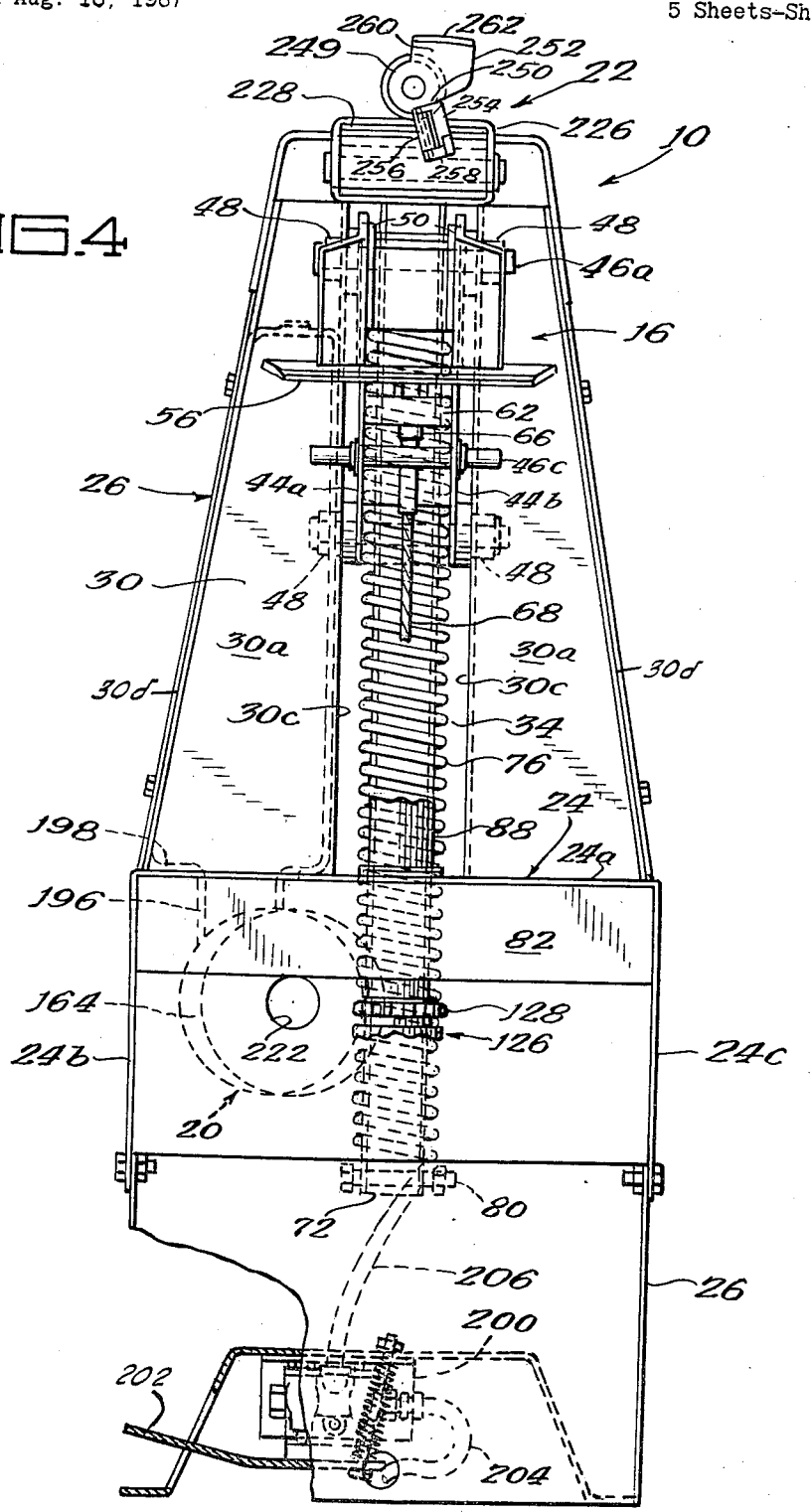
FIGURE 4 is an end elevational view of the tire changing stand of FIGURE 1, with parts broken away for clarity of illustration.

The tire changing stand 10 of this invention is intended for use in removing or replacing tires 12 relative to rims 14. Generally speaking the tire changing stand includes a bead breaking means 16 for separating tire beads from vehicle rims; a rotatable rim holding assembly 18 for holding and rotating a rim during removal and replacement of tires relative to rims; a single power source 20 for driving the bead breaking means 16 and the rotatable tire holding assembly 18; and a tool assembly 22 for use in removing and replacing tires relative to the rims as the tires are held and driven by the rotatable tire tool assembly 18.

Basic supporting structure

The tire changing stand 10 includes a frame 24 supported on a base 26 with an upright column 28 at one end of the frame. The frame generally includes a U-shape member of heavy gauge sheet metal having a top 24a and depending sides 24b and 24c. The column generally consists of two generally identical spaced apart hollow trapezoidal boxes 30, each of which has a front wall 30a, a rear wall 30b, inside walls 30c and outside walls 30d, respectively. The space between the mutually opposing inside walls 30c defines a tracking channel 34.

In the area adjacent the base of column 28 and the top of frame 24, a tire supporting shelf 36 is provided for holding a portion of a tire and rim during the bead breaking operation. In the illustrated embodiment, the shelf 36 is comprised of a pair of generally identical opposed angle iron members 38 including spaced apart upright portions 38a and outwardly facing lip portions 38b. Bracing members 38c extend downwardly and outwardly from the members 38 to the frame 24 for transferring load imposed upon the shelf 36 into the frame. An arcuate rim stop 42 spans the distance between the upright portions 38a of members 38 and protrudes slightly above the lip portions 38b. In use, the rim stop 42 is utilized in generally registering a vehicle rim and tire with respect to the bead breaker assembly 16.

Bead breaker assembly

The bead breaker assembly includes a box-like tracking member 44 having opposite side walls 44a and 44b closely adjacent inside walls 30c and a rear wall 44c which spans the side walls 44a and 44b. Pins 46a, 46b, 46c, and 46d extend through side walls 44a and 44b on opposite sides of front walls 30a and rear walls 30b. Rollers 48 are mounted at the opposite ends of diametrically opposite pins 46a and 46c, with the rollers and pins 46b and 46d in engagement with the front walls 30a and rear walls 30b, thereby mounting the tracking member 44 for vertical to and fro movement in column 28. A pair of arms 50 extend outwardly from the member 44 and support a spring mounting pin 52 and a shoe assembly mounting pivot pin 54, by means of which arcuate bead breaker shoe 56 is pivotally mounted to the arms 50a and 50b. A pin 58 extends through shoe 56 and spring means 60 joins shoe pin 58 and arm pin 52 to normally hold the shoe in a slightly retracted position. This arrangement is similar to that described in the Strang Patent No 3,255,800 and keeps the shoe normally retracted, but as the shoe engages the side wall of a tire to break the tire bead from the rim bead seat, the frictional engagement of the bead breaker with the tire shoe side wall will cause the shoe to slowly swing inwardly toward the center of the rim, overcoming the opposition of the spring 60.

A bracket 62 is provided between the side walls 44a and 44b of member 44 and has an opening 64 for receiving the bolt-like end 66 of a cable 68 for securement of the cable to the bracket, and therefore the bead breaker assembly, by means of nut 70 which is located on the opposite side of bracket 62.

A rigid member 72, shown in the form of a bar, hangs from a pin 74 which extends across the top of member 44, engaging the top of side walls 30c. A strong compression spring 76 is positioned around bar 72 and abuts the underside of member 44 in the area of arms 50. A large washer 78 is positioned at the bottom of spring 76 and is held by a pin 80 which extends through the bar 72. By this means, the bead breaker assembly 16 is normally urged upwardly in the uppermost, or retracted position, as shown in the drawings. Preferably the compression spring 76 is of such strength as to maintain a tension of 600 lbs. or so on the cable 68 which is connected to the bead breaker assembly 16.

Rotatable tire holding assembly

A channel-shaped bracing member 82 spans the interior of the front end of the frame, and mounted generally centrally thereof is an upright sleeve 84 which rotatably receives a shaft 86. A spacer sleeve 88 is interposed between the top of the frame and the underside of a generally rectangular box-like tire holding table 90, the sleeve 88 abutting the bottom 92 of the table 90. Table 90 has an opening 94 through which shaft 86 extends; side walls 96, which are slotted as shown at 98; and a top 100. Top 100 rests on shelf 101 and is removable to accommodate rims with protruding center well portions.

A pinion 102 is fixed on the end of shaft 86 in the interior of table 90 and is in meshing engagement with racks 103 and 104. Each rack is slidably mounted against opposite side walls in the interior of the table 90 for to and fro movement toward and away from each other. The ends of each rack 103 and 104 spaced away from pinion 102 are provided with transverse bridges 108 and 110, respectively, which project outwardly through the slots 98 in the side walls 96 of the table. The slots are closed, as at 111 (FIG. 2), at the extreme ends thereof to limit the rearward movement of the racks with respect to the pinion.

Ears 112 project upwardly and outwardly from the opposite ends of bridges 108 and 110, respectively, and support fingers 116 which extend upwardly at approximately a 50° angle and which also extend inwardly to the center of table 90 at approximately a 30° angle. The fingers have reduced, knurled ends 120. The ears 112 have a short horizontal shelf 122 adjacent fingers 116. The generally V-shaped space 124 (FIG. 1) between each knurled end 120 and each shelf 122 forms a jaw or crotch for receiving a vehicle rim to frictionally hold the rim locally in each jaw of the tire table after the fingers are moved inwardly to engage the rim. The knurled end 120 of each finger and the shelf 122 of each ear captivate the rims locally by wedging action between the bead seat 125a and the rim flange 125b (FIGS. 9 and 10). Thus, as shaft 86 is rotated, pinion 102 drives racks 103 and 104 toward each other to move the bridges 108 and 110, and, therefore, the fingers 116 toward each other. Once the fingers are advanced to the point where the rim is captivated in the several spaces 124 between the knurled ends 120 and the shelf 122 of each ear, thereby firmly gripped and centered on table 18, the racks can no longer move toward each other, and rotation of the pinion is translated into rotatable movement of the table 18. By this arrangement, the wheel rim is subjected to a clamping force only in an amount necessary to grip the rim irrespective of the total capability of the system.

Table 18 may be selectively connected or disconnected by means of the generally indicated clutch mechanism 126. Included in the clutch 126 is a sprocket 128 having a central bore 129 and being rotatably mounted about shaft 86 with the aid of bearing 130 which extends into sleeve 84. The lower side of sprocket 128 is provided with serrated teeth 132 having a beveled surface 132a terminating in an upright shoulder 132b. A ratchet 134 is connected to shaft 86 for rotation therewith below sprocket 128 but is axially movable relative to shaft 86. The lower surface of ratchet 134 has an enlarged flange 134a. Ratchet 134 is provided with serrated teeth 136 on the upper surface thereof for driving engagement with the teeth 132 in the bottom of the sprocket. Ratchet teeth 136 also have a beveled edge 136a terminating in an upright shoulder 136b which opposes sprocket teeth shoulder 132b. A spring 138 abuts the underside of ratchet 134 and a collar 140 which is fixed to shaft 86 below spring 138 to normally urge the ratchet into engagement with the sprocket to drive the ratchet, and therefore the shaft 86, in one direction, and allow relative slippage between the sprocket and ratchet in the other direction so the shaft 86 will not be driven.

Means 142 are provided for selectively disconnecting the clutch 126. A pair of fingers 144 rest on the ratchet flange 134a and are part of the free end of spaced arms 146 which are pivoted at 148 to a bar 150 which depends from the underside of frame top 24a. Arms 146 are connected at 151 to spaced, parallel upright arms 152 which are connected together by a cross pin 154 which spans the space between the members 38 nad 40 of the tire support shelf. A J-crank 156 has an upper finger 156a which is connected to a tube 158 rotatably connected to the spaced upright portions 38a of members 38. Portion 156b of crank 156 passes under pin 154 which joins upright arms 152 and terminates in upwardly extending portion 156c. As crank 156 is pivoted downwardly as indicated by arrow A in FIGURE 2, a pin 156, and therefore arms 152, are lifted as indicated by arrow B in FIGURE 2, causing arms 146 to be pivoted about the pivot 148 and thereby moving the fingers 144 downwardly as indicated by arrow C in FIGURES 2 and 12.

Downward movement of fingers 144 in opposition to spring 138 moves ratchet 134 away from sprocket 128 and thereby disconnects the two as shown in FIGURE 12, so that no driving force imparted to sprocket 128 will be transmitted through shaft 86.

Drive system

A single power source 20 is provided for driving both the bead breaker means 16 and the tire holding assembly 18. In the illustrated embodiment, this single power source preferably takes the form of a piston and cylinder device 164 which is illustrated as a single-acting hydraulically damped, air cylinder having a piston 166 and the usual linearly extensible rod 168. The piston 166 separates the cylinder into an oil chamber 170 and an air chamber 172. Rod 168 extends outwardly of the cylinder through a hub 174 which is provided with bearings 176 and an O-ring 178 to provide suitable bearing and sealing surfaces for the rod 168.

The rod is connected to a chain 180 which is wound about the sprocket 128 in a generally horizontal plane. The other end of the chain is connected at 181 to the cable 68. Cable 68 is wound about sheave 182 which is mounted on pin 184 for rotation in a vertical plane, thereby turning the cable vertically so it can extend upwardly to its connection with the bead breaker assembly in the area of the bracket 62, as previously described. The force exerted by compression spring 76 on bead breaker assembly 16 creates a constant tension on the cable 68 and chain 180, and these elements combine to provide a flexible drive member or system under tension.

Means are provided for controlling the rate of travel of the piston and rod and, therefore the rate of travel of the bead breaker assembly and the tire holding assembly. In the illustrated embodiment, the rear wall of the cylinder 164 is provided with an opening 186 which opens into a metering chamber 188. A spring 190 in the metering chamber normally forces valve plate 192 against chamber cap 194. Valve plate 192 has a plurality of radially arrayed enlarged openings 192a and a small central opening 192b. Cap 194 has a central opening 194a which is larger than opening 192b in valve 192. When the rod is moved to the left, and the piston advances toward the metering chamber 188, with the spring 190 urging valve 192 against cap 194, oil can only flow outwardly through small opening 192b in the valve 192 and then through opening 194a in cap 194.

Oil is forced out through flexible tubing 196 which is clamped to cap 194 by clamp 197, up to a reservoir 198 which is positioned on the inside of one of the column members 30 or 32. A constant level of oil is maintained in reservoir 198 (FIGURE 4) so that there will be aeration problem as the oil is forced outwardly from the cylinder 164. Reservoir 198 may be a member of rather flexible plastic or the like with the metal column member 30 serving to confine the reservoir, give the reservoir its shape, and protect it against puncture or the like.

The cylinder is actuated by means of valve 200 which has a foot operated pedal 202. A line 204 leads from a source of compressed air and a line 206 leads from the valve to a fitting 207 which communicates with air chamber 168 in the cylinder 164. When pedal 202 is depressed, air under pressure is fed from the source of compressed air through line 206 to the cylinder. This air causes the rod and piston to be moved to the left as viewed in the drawings, forcing the oil outwardly of the cylinder to control the rate of travel of the piston rod. This retraction of the rod inwardly of the cylinder causes movement of the flexible drive member, in that the chain 180 is pulled around the sprocket 128 and the cable 68 is moved toward this sprocket, thereby moving downwardly in column 26, pulling the bead breaker shoe 56 downwardly of the column. If the clutch 126 is not disengaged, this movement will also cause rotation of shaft 86 so that he fingers 116 will be moved toward each other to clamp a rim 14, and then the table 90 will be rotated. When the pedal 202 is released, air is allowed to exhaust from the cylinder 164, and the force of compression spring 76 pulls the bead breaker assembly 16 upwardly, pulling the cable 68 therewith and pulling the chain 180 back around the sprocket 28 as well as pulling the rod 168 outwardly from the cylinder. Table 90 will not be rotated because the beveled ratchet and sprocket teeth of the clutch assembly slip by each other.

Cylinder mounting

The exterior of cylinder hub 174 is provided with a reduced end 210, an enlarged portion 212 and an intermediate frusto-conical portion 214. A snap ring groove 216 is formed in reduced end 210 for receiving snap ring 218 to hold the hub, and therefore the cylinder 164, in a frame brace or Z-bar 220 during assembly when the hub 174 is inserted through opening 222 in brace 220. Once the cylinder is so positioned and the chain 180 is connected to the rod 168, the tension in the drive system pulls the cylinder so that the rear edge 222a of opening 222 seats on the frusto-conical portion 214 of hub 174, providing a swivel mounting for the cylinder with respect to the frame. With this mounting, tolerances in the sizes of frusto-conical portion 214 and opening 222 are easily accommodated. Also, any side loads which may be imposed during the extension and retraction of the rod and movement of the piston in the cylinder will be taken up as swivelling movement of the cylinder and will not create side loads or wear on the bearing surfaces within the hub or on the piston seals. The limited amount of swivelling movement is easily compensated for by the flexible tubing 196 which connects the rear of the cylinder to the reservoir 198.

Tire tool assembly

Tire tool assembly 22 includes a generally horizontally extending box-like sleeve 226 mounted on top of column 28. A box-like slide member 228 is mounted in the sleeve 226 for to and fro movement, the slide member 228 having a generally loosely concentric configuration relative to sleeve 226. A pin 230 at the forward end of slide 228 pivotally mounts a tool holder 232, including a stop member 234 and a sleeve portion 236. Stop member 234 is provided with a bent end portion 234a. End portion 234a is positioned so that the tool holder sleeve 236 will be generally oriented at a 60° angle relative to the plane of a rim held on the rim gripping table when the stop member portion 234a abuts the free end of slide member 228.

Sleeve portion 236 is generally circular cylindrical but has opposite flattened portions 236a and 236b at one end. The tool 240 includes a handle portion 242 and a shank 244 which is generally square in cross section. The sleeve flattened portions 236a and 236b are spaced apart a distance to generally matingly embrace two opposed sides of the shank portion 244. The shank has a rounded portion 246 near the working end of tool 240, the rounded portion having an axial length which is equal to, or slightly greater than, the flats 236a and 236b so that when the tool is retracted or slid rearwardly in sleeve 236, the rounded portion 246 may be brought into the area of the flats 236a and 236b, the tool rotated, slid outwardly, and oriented in a different position with respect to the sleeve 236.

The working end of tool 240 includes a tapered roller assembly 248 which is rotatably mounted about the end of the tool shank. A collar 249 is fixed to the end of the shank 244 of tool 240 and includes demounting portion 250 and a mounting portion 252. Demounting portion 250 includes a radially outwardly extending finger 254 having a radially outwardly extending rotatable roller 256, and a downturned hook 258 at the free end of finger 254. Mounting portion 252 includes a fan-shaped cam surface 260 which terminates in a downturned hook 262.

In use, when a rim and tire are held on the tire holding table 90, the tire tool is brought to the proper position by moving slide member 228 laterally outwardly from sleeve 226 and allowing the tool holder 232 to pivot so as to generally orient the tool at 60° relative to the rim. The tool is rotated within the sleeve 236 so as to bring the desired working end, either the demounting or mounting portion thereof, into proper orientation with the rim. The tool is then moved axially downwardly of the sleeve, and the assembly is further adjusted by moving the slide member 228 until one of the hooks 258 or 262 engages the rim flange. For example, when the tool is to perform the demounting function, the tool is positioned with the hook 258 engaging the rim flange. A pry bar 264 may be utilized to first pry the tire bead 266 over the rim flange. Then the table is rotated to drive the tire and rim with the tool remaining fixed. The tire bead 266 travels over the roller 256, finger 254, and also past the roller 248 as it is raised over the rim flange. The opposite bead is also removed in the same fashion. When it is desired to mount a tire on the rim, the tool is positioned so that the hook 262 engages the rim and the table is rotated to drive the wheel and the rim with the tire bead passing over the fan-shaped cam 260 and past roller 248, whereby it is urged downwardly under the rim range.

Positive location of the tool in an optimum mounting position for any size of vehicle rim and tire that is held on the tire table is insured by means of the disclosed mounting arrangement. The tool will always be generally oriented at about a 60° angle, which has been found to be the optimum operating angle for this type of tool. An operator will be able to positively determine that the tool is properly located by the simple expedient of positioning the tool so that one of the two hooks 258 or 262 engages the rim flange. The tool is easily brought to this position by moving slide member 228 and by moving the tool shank 244 within the sleeve 236. When one of the hooks engages the rim flange, the tool is properly oriented for optimum operation.

In operation, a tire 12 and rim 14 are placed, as shown in dotted outline in FIGURE 2, so that part of the tire 12 rests on the shelf structure 36 and the other part rests on the tire holding assembly 18. This causes crank 156 to be pivoted downwardly as indicated by the arrow A in FIGURE 2, and, through the associated linkage, causes arms 146 to be pivoted downwardly in the direction indicated by the arrow C in FIGURES 2 and 12, to move ratchet 134 away from sprocket 128 and thereby disconnect shaft 86 from sprocket 128. Next, the operator depresses the pedal 202 of valve 200 to introduce fluid to cylinder 164. This causes piston rod 168 to retract, forcing piston 166 against the oil in the oil chamber side 170 of cylinder 164. The oil is forced into reservoir 198. Retraction of rod 168 pulls chain 180 and cable 68 of the flexible tensioned drive member, thereby pulling bead breaking assembly 16 downwardly against the force of compression spring 76. This brings the bead breaker shoe 56 into engagement with the side wall of tire 12 to separate the tire bead away from the vehicle rim. The operator may then release foot pedal 202 which causes a reverse movement as compression spring 76 exerts its influence. The operator then reverses the orientation of the tire 12 and rim 14 so that the other side is exposed to the bead breaker assembly and the operation is repeated so that both beads are separated or "broken" from the flange of the wheel rim 14.

Next the operator moves the rim 14 and tire 12 over to the rim holding assembly 18. Sprocket 128 and ratchet 134 are now in engagement as lever 156 returns to the upright position and arms 146 no longer urge sprocket 136 downwardly on shaft 86. Thus, rotation of sprocket 128 will cause rotation of shaft 86. When the rim 14 is relatively centered on a rim gripping table 90, the operator depresses pedal 202 to actuate the cylinder and retract the rod as previously described. Now through the connection of sprocket 128, ratchet 134 and shaft 86, the gear 102 engages with ratchet 103 to draw the rim gripping fingers 116 inwardly until they mutually grip the rim. At this point the operator inserts the working end 240 of tire tool between the rim flange and the tire with the tool oriented as shown in FIGURE 9. Further actuation of the cylinder by depression of pedal 202 of valve 200 now causes rotation of the rim gripping table 90. With the tire tool inserted between the rim flange and the tire bead, the tire bead will be pulled over the rim flange. Once this is accomplished for one side of the tire, the tire is removed from the rim gripping table, its orientation reversed, and the operation repeated. For mounting a tire on a rim, the rim is gripped as explained, but the tire tool is oriented with the mounting portion 252 between the tire bead and rim flange.

This invention provides a tire changing stand which is capable of removing and replacing tires from rims of a wide variety of sizes, shapes and styles. Rims are peripherally clamped so that the size or presence of a center opening is of no importance. Clamping is accomplished in an area which is hidden from view when the tire is mounted on the rim so that any defacing of the rim will not be exposed to view. Only a single power source is utilized to drive the movable components to break the tire beads, clamp the rim, and rotate the rim gripping table. The power source drives a flexible tensioned member which assists in supporting the cylinder in a unique swivel mounting. The selective disconnection of the driving member to the rim table permits the tire and rim to partially rest on the rim gripping table during bead breaking. Finally, optimum positioning of the tire tool for tire removal and mounting is insured by the inherent structure of the tire tool assembly.

The foregoing detailed description has been given for clearness of understanding only, and no unnecessary limitations should be understood therefrom, as some modifications may be obvious to those skilled in the art.

We claim:

1. A tire changing stand for use in mounting and demounting tires relative to vehicle rims, comprising: a generally horizontal base frame; a rotatable wheel gripping table mounted upon a supporting shaft at one end of the base frame; an upright column at the other end of the base frame; a bead breaker shoe carriage trackably mounted on the column for movement toward and away from the base frame; a single drive motor in the base frame; an elongate flexible tensioned drive member connected to the motor and passing from the motor about the table supporting shaft with a selectively connectable driving connection thereto, the drive member passing up the column to connection with the shoe carriage; whereby the single motor may drive the bead breaker shoe carriage to loosen tire beads from a wheel rim resting on the base frame and may rotate a wheel rim clamped to the wheel gripping table for tire demounting and mounting relative to the rim.

2. The tire changing stand of claim 1 wherein the flexible drive member is connected to the wheel gripping table supporting shaft by a clutch assembly which provides for full rotation of the table in one direction upon each actuation of the single drive motor.

3. The tire changing stand of claim 1 wherein a tire holding stop is provided on the base frame foor registering the wheel rim in a position to be engaged by the bead breaker shoe carriage and a crank element is movably mounted adjacent the tire holding stop, the crank element being connected to a lever system which is operably associated with the table supporting shaft for selectively connecting and disconnecting the operable connection between the flexible drive member and the table supporting shaft, whereby occupation of a wheel rim and tire in the area of the tire holding stop will cause movement of the lever system to thereby disengage the driving connection between the flexible drive member and the rotating tire table so that the outboard side of a vehicle tire and rim which are being acted upon by the bead breaker shoe carriage may rest upon the table during the bead breaking operation.

4. The tire changing stand of claim 1 wherein the tension flexible drive member comprises at least in part a roller chain meshed over a sprocket on the table supporting shaft, with clutch means provided on the table supporting shaft for connecting and disconnecting the driving connection of the sprocket to the shaft and for rotating the table supporting shaft in a single direction.

5. The tire changing stand of claim 1 wherein the flexible drive member is connected to spring means which normally urges the drive member to a position of extension with respect to the single power source to thereby preload the flexible drive member during the movement thereof as well as during the positions of rest thereof.

6. The tire changing stand of claim 1 wherein the single drive motor comprises a piston and cylinder device having a piston rod which is linearly extensible and retractable relative to the cylinder upon actuation thereof.

7. The tire changing stand of claim 6 wherein the piston and cylinder device is divided by the piston into an air chamber for the admission of air under pressure to drive the piston, and an oil chamber which normally contains hydraulic fluid, the oil chamber being in communication with an oil reservoir in the column; and speed control means in the path of fluid flow from the piston and cylinder device to the reservoir, so that upon actuation of the cylinder, the rate of travel of the piston and rod is governed by the speed control means regulating the flow of oil outwardly from the cylinder into the reservoir in the column.

8. The tire changing stand of claim 6 wherein the piston and cylinder device is provided with a generally frusto-conical surface on the forward end thereof and wherein a member depends from the frame and is provided with a generally circular opening of a size which generally intersects the frusto-conical surface of the piston and cylinder device, the piston and cylinder device being mounted to the frame by engagement of said frusto-conical surface with an edge of said opening and the connection of the piston rod to the tensioned drive member, whereby universal adjustment of the cylinder rod and piston is provided for straight line motion of the flexible tensioned drive member during operation of the piston and cylinder device.

9. The tire changing stand of claim 1 wherein the table supporting shaft is connected to a toothed pinion within the table and a pair of racks are solidably mounted in the table in meshing engagement with the pinion, each rack supporting a pair of spaced inwardly and upwardly projecting wheel rim gripping jaws, the racks and associated jaws being movable across the table for engaging the edges of a wheel rim responsive to actuation of the table supporting shaft to drive the pinion and to further rotate the table and a wheel rim mounted thereon when the jaws are moved into gripping engagement with a wheel rim.

10. The tire changing stand of claim 9 wherein the wheel rim jaws include two fingers oriented in a V-angle relationship to each other for wedging a wheel rim between the fingers to frictionally clamp the wheel rim locally in the area of the jaws.

11. The tire changing stand of claim 1 wherein a tool holder is slidably mounted across the upper end of the column for movement toward and away from the tire holding table with a tire tool having a working end slidably mounted in the holder for movement toward and away from the table at an angle to the plane of a wheel rim clamped on the table, with both the holder and tool freely movable toward the tire holding table, movement thereof being limited by engagement of the working end of the tool with a vehicle rim.

12. The tire changing stand of claim 11 wherein the working end of the tool has generally opposed take-off parts and put-on parts; and wherein the tire tool has a handle with a generally polygonal exterior which matingly engages portions of the holder for holding the tool in at least two positions generally 180° apart about the center line of the tool handle for alternatively placing the take-off tool parts and put-on tool parts in operative relation to a wheel rim.

References Cited

UNITED STATES PATENTS

| | | | |
|---|---|---|---|
| 3,165,142 | 1/1965 | Tabordon | 157—1.17 |
| 3,212,552 | 10/1965 | Foster | 157—1.17 |
| 3,255,800 | 6/1966 | Strang et al. | 157—1.24 |
| 3,339,611 | 9/1967 | Scott | 157—1.24 |

GRANVILLE Y. CUSTER, JR., Primary Examiner